(12) United States Patent
Mehta et al.

(10) Patent No.: US 11,347,295 B2
(45) Date of Patent: May 31, 2022

(54) VIRTUAL MACHINE POWER MANAGEMENT

(71) Applicant: Citrix Systems, Inc., Fort Lauderdale, FL (US)

(72) Inventors: Nitin D. Mehta, Fort Lauderdale, FL (US); Leo C. Singleton, IV, Fort Lauderdale, FL (US); Kevin Woodmansee, Fort Lauderdale, FL (US); Jitendra Deshpande, Fort Lauderdale, FL (US); Harsh Murarka, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 257 days.

(21) Appl. No.: 15/653,697

(22) Filed: Jul. 19, 2017

(65) Prior Publication Data

US 2019/0025903 A1 Jan. 24, 2019

(51) Int. Cl.
*G06F 1/3287* (2019.01)
*G06F 9/455* (2018.01)
*G06F 1/3206* (2019.01)
*G06F 9/50* (2006.01)
*H04L 67/10* (2022.01)

(52) U.S. Cl.
CPC ......... *G06F 1/3287* (2013.01); *G06F 1/3206* (2013.01); *G06F 9/45558* (2013.01); *G06F 9/5094* (2013.01); *H04L 67/10* (2013.01)

(58) Field of Classification Search
CPC .. G06F 1/3206; G06F 1/3287; G06F 9/45558; G06F 9/5094; H04L 67/10
See application file for complete search history.

(56) References Cited

U.S. PATENT DOCUMENTS

| | | | | |
|---|---|---|---|---|
| 9,477,286 B2* | 10/2016 | Arndt | ................... | G06F 1/3203 |
| 9,575,808 B1* | 2/2017 | Yamala | ............... | G06F 9/45558 |
| 9,678,778 B1* | 6/2017 | Youseff | ............... | G06F 9/45558 |
| 10,009,249 B2* | 6/2018 | Broussard | ............. | H04L 47/823 |
| 2006/0136578 A1* | 6/2006 | Covell | ............... | H04L 43/0829 709/223 |
| 2006/0149977 A1* | 7/2006 | Cooper | ................. | G06F 1/3215 713/300 |
| 2009/0254660 A1* | 10/2009 | Hanson | ................... | H04L 12/10 709/226 |
| 2010/0218005 A1* | 8/2010 | Jain | ....................... | G06F 9/5094 713/300 |
| 2011/0072293 A1* | 3/2011 | Mazzaferri | ........... | G06F 1/3203 713/340 |

(Continued)

*Primary Examiner* — Jaweed A Abbaszadeh
*Assistant Examiner* — Brian J Corcoran
(74) *Attorney, Agent, or Firm* — Fox Rothschild LLP; Robert J. Sacco; Carol E. Thorstad-Forsyth

(57) ABSTRACT

Methods and system for power management of computing resources supporting one or more virtual machines involves grouping the plurality of virtual machines into a plurality of groups. The grouping can comprise assigning each of the plurality of virtual machines to one or more of the plurality of groups based on virtual machine functionality. For each group, a further determination is made as to whether the level of activity is indicative of an idle state. Upon determining that the level of activity associated with a group is indicative of an idle state, that group of virtual machines is instructed to enter a low power mode.

24 Claims, 7 Drawing Sheets

(56) References Cited

U.S. PATENT DOCUMENTS

| | | | | |
|---|---|---|---|---|
| 2011/0078303 A1* | 3/2011 | Li | ............... | H04L 67/1012 709/224 |
| 2011/0307887 A1* | 12/2011 | Huang | ............... | G06F 1/3228 718/1 |
| 2012/0227038 A1* | 9/2012 | Hunt | ............... | G06F 9/45558 718/1 |
| 2012/0239323 A1* | 9/2012 | McGrane | ............... | G06F 1/3206 702/62 |
| 2013/0268646 A1* | 10/2013 | Doron | ............... | H04L 67/1002 709/223 |
| 2013/0297668 A1* | 11/2013 | McGrath | ............... | G06F 9/485 709/201 |
| 2014/0245294 A1* | 8/2014 | Kaul | ............... | G06F 9/45558 718/1 |
| 2015/0249615 A1* | 9/2015 | Chen | ............... | G06F 9/45558 709/226 |
| 2015/0261555 A1* | 9/2015 | Greden | ............... | G06F 9/45545 718/1 |
| 2015/0365291 A1* | 12/2015 | Burton | ............... | H04L 41/0893 709/226 |
| 2016/0062780 A1* | 3/2016 | Young | ............... | G06F 9/45558 718/1 |
| 2016/0188377 A1* | 6/2016 | Thimmappa | ............... | G06F 16/285 718/104 |
| 2016/0323377 A1* | 11/2016 | Einkauf | ............... | H04L 43/0876 |
| 2016/0335111 A1* | 11/2016 | Bruun | ............... | G06F 9/45558 |
| 2017/0102757 A1* | 4/2017 | Kang | ............... | G06F 9/5094 |
| 2017/0329390 A1* | 11/2017 | Shah | ............... | G06F 9/4418 |
| 2017/0364380 A1* | 12/2017 | Frye, Jr. | ............... | G06F 9/45558 |
| 2018/0004575 A1* | 1/2018 | Marriner | ............... | G06F 9/45558 |
| 2018/0232253 A1* | 8/2018 | Michimura | ............... | G06F 9/485 |
| 2018/0295044 A1* | 10/2018 | Johnson | ............... | H04L 41/145 |

* cited by examiner

VIRTUAL MACHINE POWER MANAGEMENT

BACKGROUND

Statement of the Technical Field

The present disclosure relates generally to cloud computing systems. More particularly, the present invention relates to implementing systems and methods for performing virtual machine power management in a server farm.

Description of the Related Art

Cloud computing allows a user to utilize applications or services running on a remotely located computer rather than on the user's local computer. For example, data may be processed in the cloud by forwarding the data from a client computer to a server computer, where the data is processed before returning the processed data back to the client computer. This way, the client computer offloads processing tasks to computers in the cloud. The clouds of computing resources generally allow for the operating systems, applications, and user settings of multiple users to be included on a single physical machine. Desktop virtualization technology allows multiple instances of a guest operating system to be kept separate within a normal host operating system, so the activities of one user may not affect the experience of other users.

In some instances, a cloud services provider may create a set of server farms so that each server farm includes a separate and isolated hosting infrastructure to serve one or more tenants of the cloud services provider. Individual server farms may host multiple tenants and may be generally configured to support the virtualization computing needs of those tenants. Other server farms may be used exclusively by one tenant, for example, a large scale or highly secure customer, and may be specifically configured based on the needs of that single tenant.

However, servers, server farms, and other information technology equipment consume large amounts of energy and create large amounts of heat even when idle or lightly used. Large applications and virtualized application environments typically require multiple servers within a single data center or spread across different data centers that are physically placed in different locations to support heavy load, reduce the risk for outages and provide response times that cannot be achieved with use of a single server. Such response time and availability is defined with service levels that set acceptable response time and availability for each application. To maintain service levels all servers usually run 24 hours a day, 7 days a week to ensure that during peak demand the overall application still meets such performance levels and load never exceeds available capacity. However, usual average monthly utilization of these servers is usually low with occasional high utilization times. In addition to the power consumption of the servers and other information technology equipment, such equipment also generates large amounts of heat that requires active cooling.

SUMMARY

The present disclosure concerns implementing systems and methods for power management computing resources which supporting one or more virtual machines. The method is performed by a computer processor and involves grouping a plurality of virtual machines into a plurality of groups. The grouping can comprise assigning each of the plurality of virtual machines to one or more of the plurality of groups based on functionality. Thereafter a level of activity associated with each of the plurality of groups is determined. For each of the plurality of groups, a further determination is made as to whether the level of activity is indicative of an idle state. In response to determining that the level of activity associated with a group is indicative of an idle state, that group of virtual machines is instructed to enter a low power mode. More particularly, entering the low power mode comprises putting one or more virtual machines in that group in a low power mode.

The disclosure also concerns an apparatus for providing power management to a cloud computing system. In such a cloud computing system, one or more electronic servers can each be capable of supporting one or more virtual machines. At least one computer processor comprised of an electronic circuit is configured to perform certain operations. Specifically, the computer processor will group a plurality of virtual machines into a plurality of groups. The grouping operation comprises assigning each of the plurality of virtual machines to one or more of the plurality of groups based on functionality associated with the virtual machines. Thereafter, a level of activity associated with each of the plurality of groups is determined. Further, for each of the plurality of groups, a determination is made as to whether the level of activity is indicative of an idle state. The computer processor is configures so that in response to determining that the level of activity associated with a group is indicative of an idle state, that group of is instructed by the computer processor to enter a low power mode. Entering the low power mode comprises putting one or more virtual machines in that group in a low power mode.

BRIEF DESCRIPTION OF THE DRAWINGS

Embodiments will be described with reference to the following drawing figures, in which like numerals represent like items throughout the figures.

DETAILED DESCRIPTION

Figure 1:
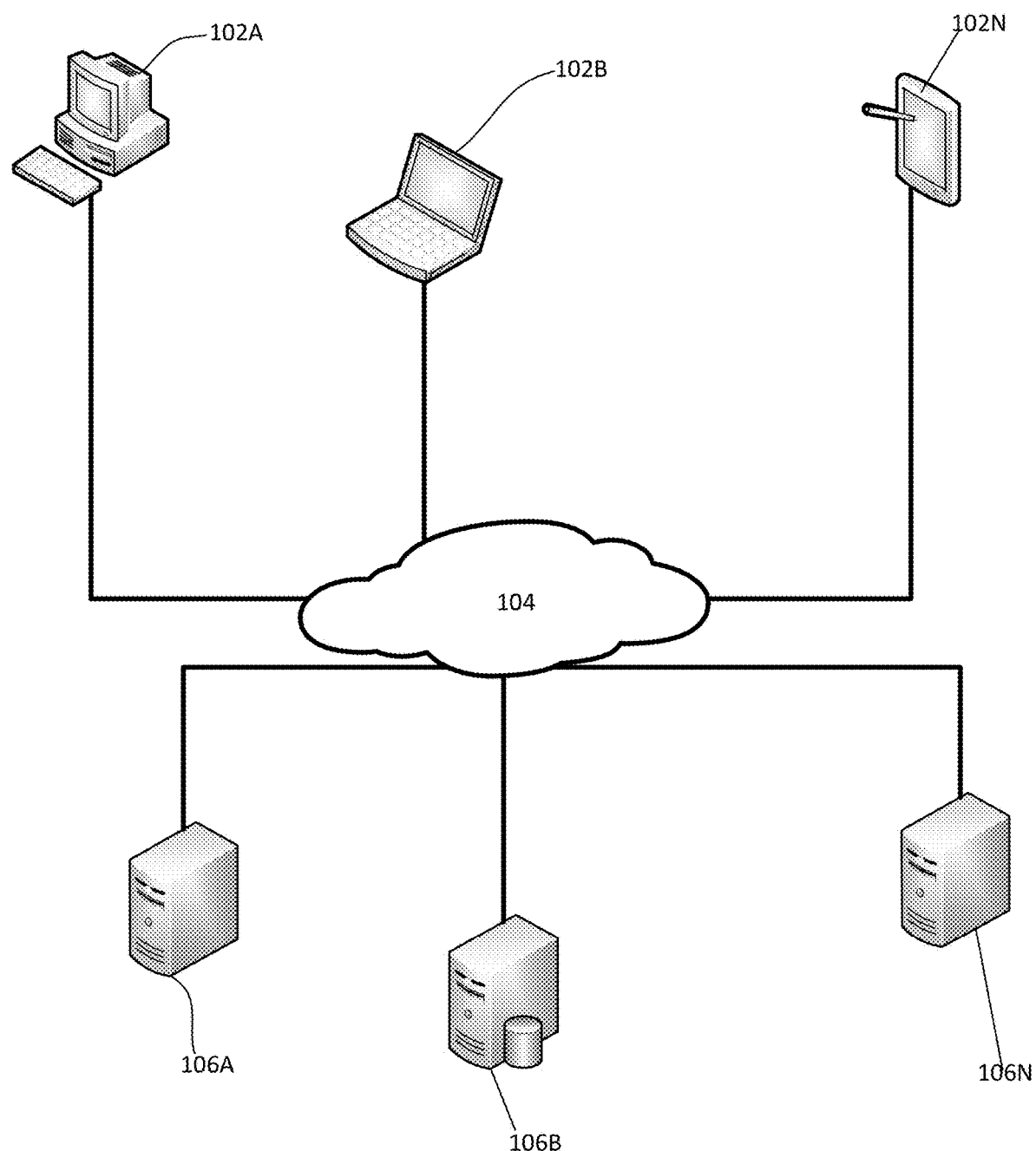
FIG. 1 is an illustration of an exemplary network and computing environment.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

In the context of this description, the following conventions, terms and/or expressions may be used. The term "virtual machine" may denote a software emulation of a particular physical computer system. Virtual machines may operate based on the computer architecture and functions of a real or hypothetical computer and their implementations may involve specialized hardware, software, or a combination of both. Virtual machines are typically deployed on top of a hypervisor (discussed below) which is instrumental in isolating a virtual machine against a physical machine.

Referring now to FIG. 1, a schematic block diagram illustrating an example computing environment in which the embodiments described herein may be implemented is shown. FIG. 1 illustrates one embodiment of a computing environment 101 that includes one or more client machines 102A-102N (generally referred to herein as "client machine(s) 102A-N") in communication with one or more servers 106A-106N (generally referred to herein as "server(s) 106A-N"). Installed in between the client machine(s) 102A-N and server(s) 106A-N is a network 104.

In one embodiment, the computing environment 101 can include an appliance installed between the server(s) 106A-N and client machine(s) 102A-N (not shown here). This appliance may manage client/server connections, and in some cases can load balance client connections amongst a plurality of backend servers. For example, the appliance may be a cloud management server and/or a cloud connector that may provide a communication link between the client machine(s) 102A-N and the server(s) 106A-N for accessing computing resources (cloud hardware and software resources) hosted by the server(s) 106A-N in a cloud-based environment. The management server may run, for example, CLOUDSTACK by Citrix Systems, Inc. of Ft. Lauderdale, Fla., or OPENSTACK, among others. The cloud hardware and software resources may include private and/or public components. For example, a cloud may be configured as a private cloud to be used by one or more particular customers or client computers and/or over a private network. In other embodiments, public clouds or public-private clouds may be used by other customers over open or closed networks.

The client machine(s) 102A-N can in some embodiment be referred to as a single client machine or a single group of client machines, while server(s) 106A-N may be referred to as a single server or a single group of servers. In one embodiment, a single client machine communicates with more than one server, while in another embodiment a single server communicates with more than one client machine. In yet another embodiment, a single client machine communicates with a single server.

Client machine(s) 102A-N can, in some embodiments, be referenced by any one of the following terms: client machine(s); client(s); client computer(s); client device(s); client computing device(s); local machine; remote machine; client node(s); endpoint(s); endpoint node(s); or a second machine. The server(s) 106A-N, in some embodiments, may be referenced by any one of the following terms: server(s), local machine; remote machine; server farm(s), host computing device(s), or a first machine(s).

In one embodiment, one or more of the client machine(s) 102A-N can be a virtual machine. The virtual machine can be any virtual machine, while in some embodiments the virtual machine can be any virtual machine managed by a hypervisor developed by XenSolutions, Citrix Systems, IBM, VMware, or any other hypervisor. In other embodiments, the virtual machine can be managed by any hypervisor, while in still other embodiments, the virtual machine can be managed by a hypervisor executing on a server or a hypervisor executing on a client machine.

The client machine(s) 102A-N can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include one or more client machine(s) 102A-N that display application output generated by an application remotely executing on a server(s) 106A-N or other remotely located machine. In these embodiments, the client machine(s) 102A-N can display the application output in an application window, a browser, or other output window. In one embodiment, the application is a desktop, while in other embodiments the application is an application that generates a desktop.

The server(s) 106A-N, in some embodiments, execute a remote presentation client or other client or program that uses a thin-client or remote-display protocol to capture display output generated by an application executing on a server and transmit the application display output to a remote client machine(s) 102A-N. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server(s) 106A-N such that the server(s) 106A-N are logically grouped together into a server farm. The server farm can include servers that are geographically dispersed and logically grouped together in a server farm, or servers that are located proximate to each other and logically grouped together in a server farm. Geographically dispersed servers within a server farm can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm may be administered as a single entity, while in other embodiments the server farm can include multiple server farms.

In some embodiments, a server farm can include server(s) 106A-N that execute a substantially similar type of operating system platform (e.g., WINDOWS NT, manufactured by Microsoft Corp. of Redmond, Wash., UNIX, LINUX, or SNOW LEOPARD.) In other embodiments, the server farm can include a first group of servers that execute a first type of operating system platform, and a second group of servers that execute a second type of operating system platform. The server farm, in other embodiments, can include servers that execute different types of operating system platforms.

The server(s) 106A-N, in some embodiments, can be any server type. For example, a server can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server executing an active directory; or a server executing an application acceleration program that provides firewall functionality, application functionality, or load balancing functionality. In some embodiments, a server may be a RADIUS server that includes a remote authentication dial-in user service. In embodiments where the server comprises an appliance, the server can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from one or more client machine(s) 102A-N, forwards the request to a second server 106B, and responds to the request generated by the client machine(s) 102A-N with a response from the second server 106B. The first server 106A can acquire an enumeration of applications available to the client machine(s) 102A-N as well as address information associated with an application server hosting an application identified within the enumeration of applications. The first server 106A can then present a response to the client's request using a web interface, and communicate directly with the client machine(s) 102A-N to provide the client machine(s) 102A-N with access to an identified application.

The server(s) 106A-N can, in some embodiments, execute any one of the following applications: a thin-client application using a thin-client protocol to transmit application display data to a client; a remote display presentation application, or the like. Another embodiment includes a server that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machine(s) 102A-N can, in some embodiments, be a client node that seek access to resources provided by a server. In other embodiments, the server(s) 106A-N may provide client machine(s) 102A-N with access to hosted resources. The server(s) 106A-N, in some embodiments, may function as a master node such that it communicates with one or more client machine(s) 102A-N or server(s) 106A-N. In some embodiments, the master node can identify and provide address information associated with a server hosting a requested application, to one or more clients or servers. In still other embodiments, the master node can be a server farm, a client machine, a cluster of client nodes, or an appliance.

One or more client machine(s) 102A-N and/or one or more server(s) 106A-N can transmit data over a network 104 installed between machines and appliances within the computing environment 101. The network 104 can comprise one or more sub-networks, and can be installed between any combination of the client machine(s) 102A-N, server(s) 106A-N, computing machines and appliances included within the computing environment 101. In some embodiments, the network 104 can be: a local-area network (LAN); a metropolitan area network (MAN); a wide area network (WAN); a primary network comprised of multiple sub-networks located between the client machines 102A-N and the servers 106A-N; a primary public network with a private sub-network; a primary private network with a public sub-network 4; or a primary private network with a private sub-network. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 2:
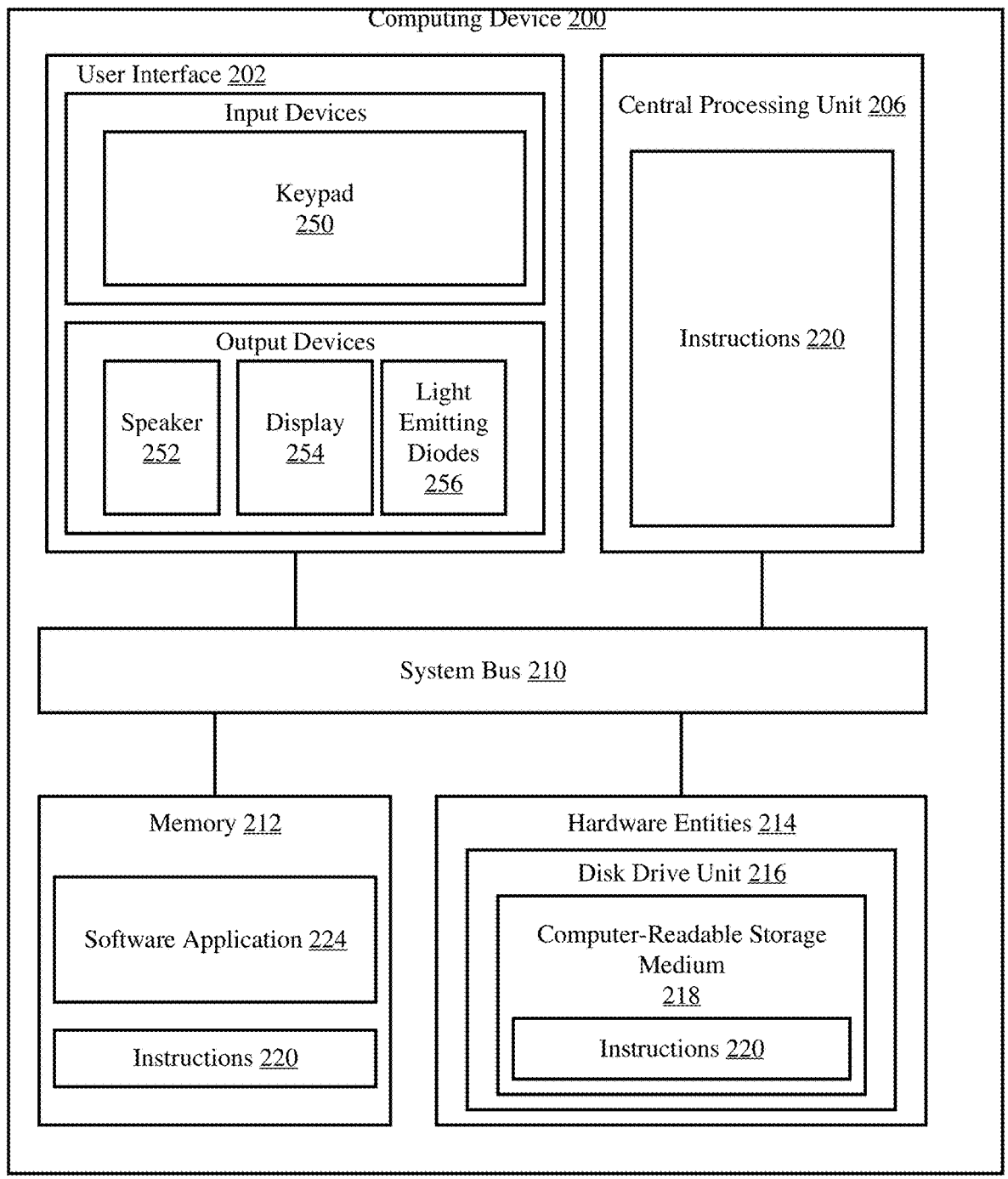
FIG. 2 is an illustration of an exemplary computing device.

Referring now to FIG. 2, there is provided a detailed block diagram of an exemplary architecture for a computing device 200, where the client machine(s) 102A-N and server (s) 106A-N illustrated in FIG. 1 can be deployed as and/or executed on any embodiment of the computing device 200. As such, the following discussion of computing device 200 is sufficient for understanding client machine(s) 102A-N and/or server(s) 106A-N of FIG. 1.

Computing device 200 may include more or less components than those shown in FIG. 2. However, the components shown are sufficient to disclose an illustrative embodiment implementing the present solution. The hardware architecture of FIG. 2 represents one embodiment of a representative computing device configured to facilitate storage and/or transmission of sensitive information in a cloud computing environment. As such, the computing device 200 of FIG. 2 implements at least a portion of a method for virtual machine power management.

Some or all the components of the computing device 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 200 comprises a user interface 202, a Central Processing Unit ("CPU") 206, a system bus 210, a memory 212 connected to and accessible by other portions of computing device 200 through system bus 210, and hardware entities 214 connected to system bus 210. The user interface can include input devices (e.g., a keypad 250) and output devices (e.g., speaker 252, a display 254, and/or light emitting diodes 256), which facilitate user-software interactions for controlling operations of the computing device 200.

At least some of the hardware entities 214 perform actions involving access to and use of memory 212, which can be a RAM, a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 222 for execution by the computing device 200 and that cause the computing device 200 to perform any one or more of the methodologies, as described herein.

In some scenarios, the hardware entities 214 include an electronic circuit (e.g., a processor) programmed for facilitating virtual machine power management in a server farm. In this regard, it should be understood that the electronic circuit can access and run a software application 224 installed on the computing device 200. The functions of the software application 224 will become apparent as the discussion progresses.

Figure 3A:
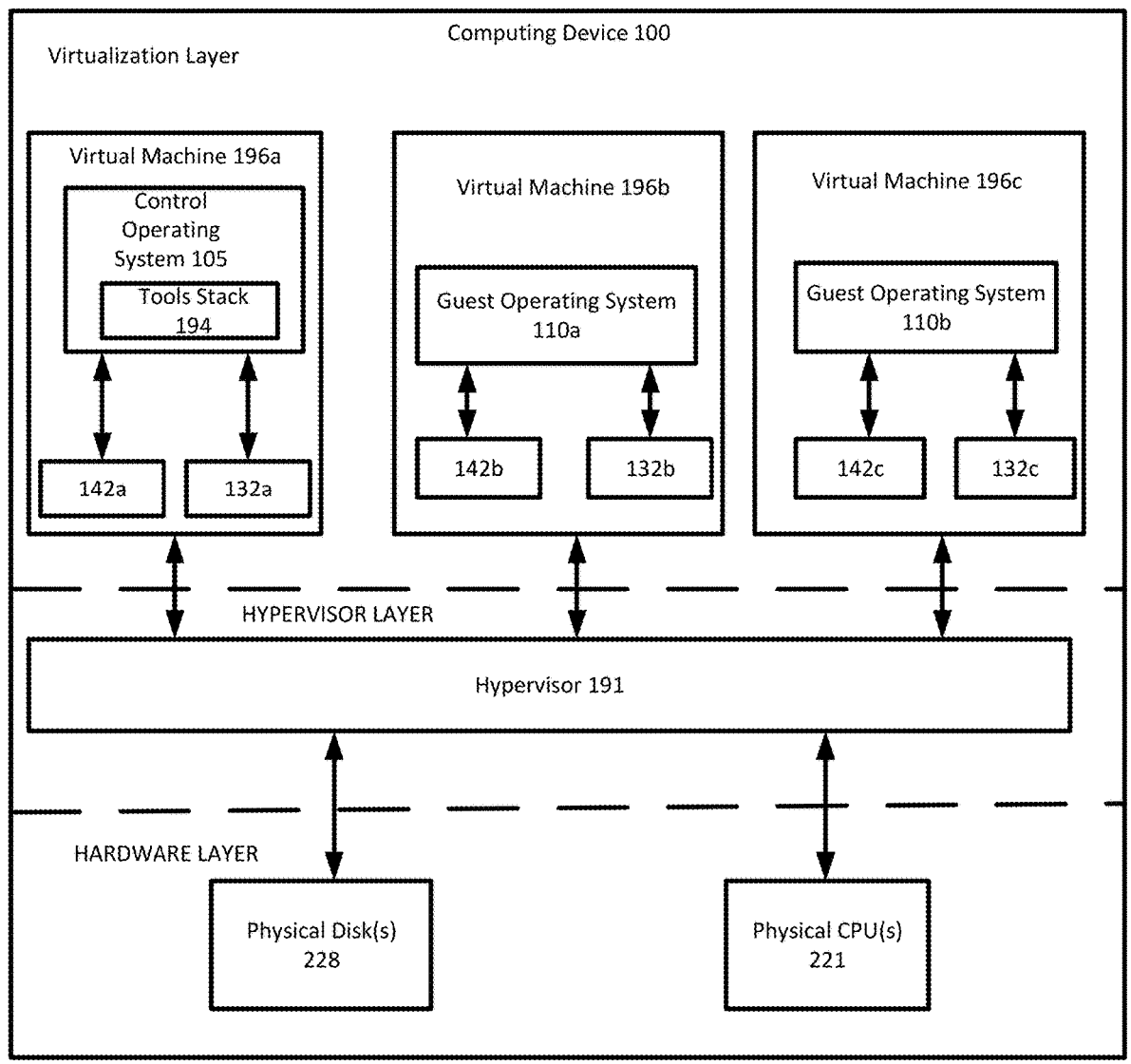
FIG. 3A is a block diagram illustrating an embodiment of a virtualization environment.

FIG. 3A illustrates a block diagram depicting one embodiment of a virtualization environment. In brief overview, a computing device 100 includes a hypervisor layer, a virtualization layer, and a hardware layer. The hypervisor layer includes a hypervisor 191 (also referred to as a virtualization manager) that allocates and manages access to a number of physical resources in the hardware layer (e.g., the processor(s) 221, and disk(s) 228) by at least one virtual machine executing in the virtualization layer. The virtualization layer includes at least one operating system and a plurality of virtual resources allocated to the at least one operating system. The operating systems can include a control operating system 105, guest operating systems 110a, 110b. Virtual resources may include, without limitation, a plurality of virtual processors 132a, 132b, and 132c, and virtual disks 142a, 142b, and 142c, as well as virtual resources such as virtual memory and virtual network interfaces. The plurality of virtual resources and the associated operating system may be referred to as a virtual machine 196a, 196b, 196c (collectively 196a-c). A virtual machine 196a may include a control operating system 105 in communication with the hypervisor 191 and used to execute applications for managing and configuring other virtual machines on the computing device 100.

A hypervisor 191 may provide virtual resources to an operating system in any manner which simulates the operating system having access to a physical device. A hypervisor 191 may provide virtual resources to any number of guest operating systems 110a and 110b. In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 191 executes within an operating system executing on a computing device. In one of these embodiments, a computing device executing an operating system and a hypervisor 191 may be said to have a host operating system (the operating system executing on the computing device), and a guest operating system (an operating system executing within a computing resource partition provided by the hypervisor 191). In other embodiments, a hypervisor 191 interacts directly with hardware on a computing device, instead of executing on a host operating system. In one of these embodiments, the hypervisor 191 may be said to be executing on "bare metal," referring to the hardware comprising the computing device.

In some embodiments, a hypervisor 191 may create a virtual machine 196a-c in which an operating system 110 executes. In one of these embodiments, for example, the hypervisor 191 loads a virtual machine image to create virtual machine(s) 196a-c. In another of these embodiments, the hypervisor 191 executes an operating system 110 within the virtual machine(s) 196a-c. In still another of these embodiments, the virtual machine 196 executes operating system(s) 110a and 110b.

In some embodiments, the hypervisor 191 controls processor scheduling and memory partitioning for a virtual machine 196 executing on the computing device 100. In one of these embodiments, the hypervisor 191 controls the execution one or more virtual machine(s) 196a-c. In another of these embodiments, the hypervisor 191 presents one or more virtual machine(s) 196a-c with an abstraction of at least one hardware resource provided by the computing device 100. In other embodiments, the hypervisor 191 controls whether and how physical processor capabilities are presented to one or more virtual machine(s) 196a-c.

Figure 3B:
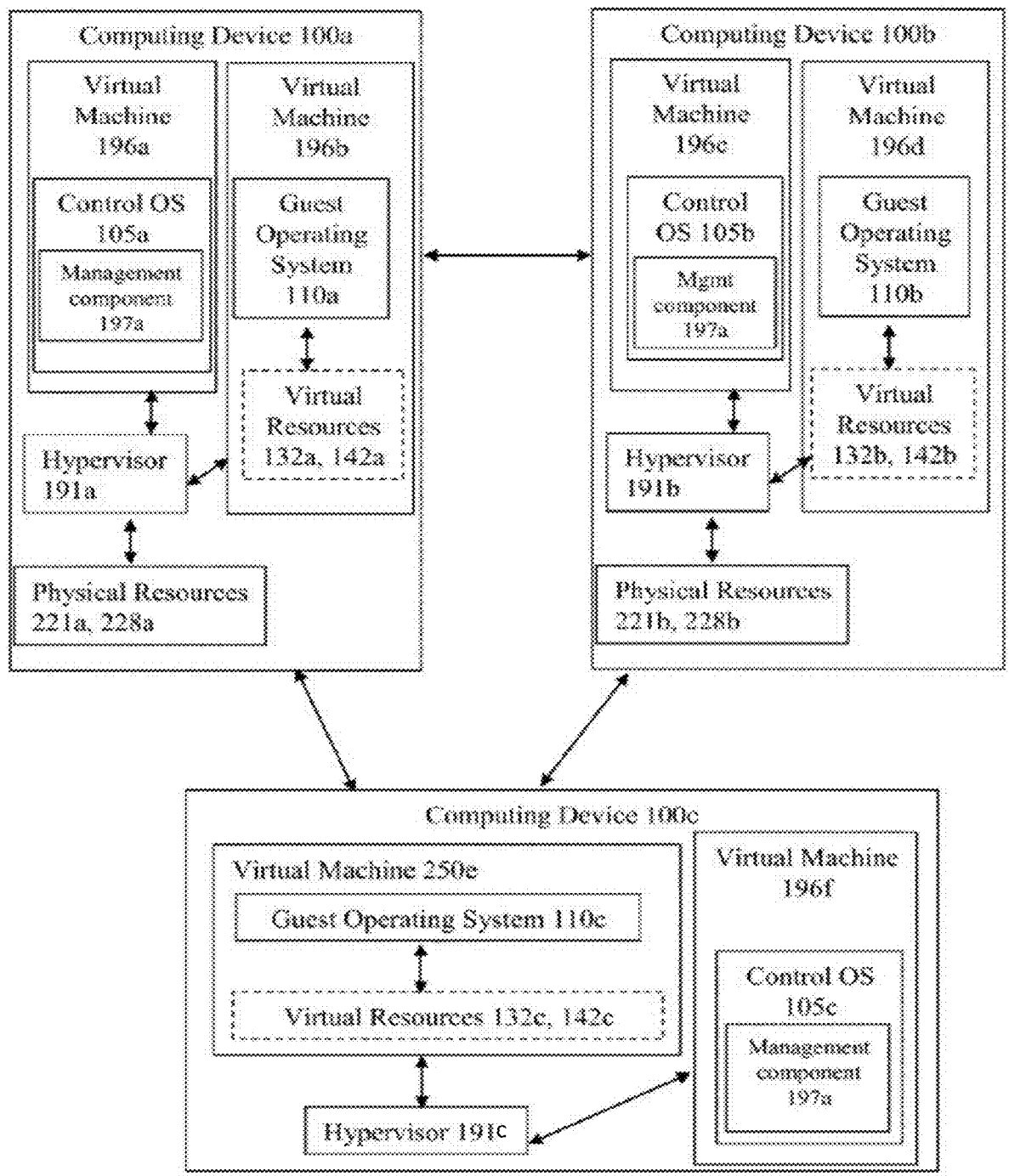
FIG. 3B is a block diagram illustrating an embodiment of a system comprising a virtual machine.

A control operating system 105 may execute at least one application for managing and configuring the guest operating systems. In one embodiment, the control operating system 105 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 191 executes the control operating system 105 within a virtual machine created by the hypervisor 191. In still another embodiment, the control operating system 105 executes in a virtual machine that is authorized to directly access physical resources on the computing device 100. As shown in FIG. 3B, in some embodiments, a control operating system 105a on a computing device 100a may exchange data with a control operating system 105b, 105c on a computing device 100b, 100c, via communications between a hypervisor 191a, a hypervisor 191b and a hypervisor 191c. In this way, one or more computing devices 100a-c may exchange data with one or more of the other computing devices 100a-c regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100a-c.

Referring back to FIG. 3A, in one embodiment, the control operating system 105 executes in a virtual machine that is authorized to interact with at least one guest operating system. In another embodiment, a guest operating system communicates with the control operating system 105 via the hypervisor 191 in order to request access to a disk or a network. In still another embodiment, the guest operating system and the control operating system 105 may communicate via a communication channel established by the hypervisor 191, such as, for example, via a plurality of shared memory pages made available by the hypervisor 191.

In some embodiments, the control operating system 105 includes a network back-end driver for communicating directly with networking hardware provided by the computing device 100. In one of these embodiments, the network back-end driver processes at least one virtual machine request from at least one guest operating system. In other embodiments, the control operating system 105 includes a block back-end driver for communicating with a storage element on the computing device 100. In one of these embodiments, the block back-end driver reads and writes data from the storage element based upon at least one request received from a guest operating system.

In one embodiment, the control operating system 105 includes a tools stack 194. In another embodiment, a tools stack 194 provides functionality for interacting with the hypervisor 191, communicating with other control operating systems (for example, on a second computing device), or managing virtual machines 196b, 196c on the computing device 100. In another embodiment, the tools stack 194 includes customized applications for providing improved management functionality to an administrator of a virtual machine farm. In some embodiments, at least one of the tools stack 194 and the control operating system 105 include a management API that provides an interface for remotely configuring and controlling virtual machines 196 running on a computing device 100. In other embodiments, the control operating system 105 communicates with the hypervisor 191 through the tools stack 194.

In one embodiment, the hypervisor 191 executes a guest operating system within a virtual machine created by the hypervisor 191. In another embodiment, the guest operating system provides a user of the computing device 100 with access to resources within a computing environment. In still another embodiment, a resource includes a program, an application, a document, a file, a plurality of applications, a plurality of files, an executable program file, a desktop environment, a computing environment, or other resources made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device and communicated to the computing device 100 via a presentation layer protocol, delivery to the computing device 100 of output data generated by an execution of the resource via a virtual machine executing on a second computing device, or execution from a removable storage device connected to the computing device 100, such as a USB device, or via a virtual machine executing on the computing device 100 and generating output data. In some embodiments, the computing device 100 transmits output data generated by the execution of the resource to another computing device.

In one embodiment, the guest operating system, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 191; in such an embodiment, the driver is typically aware that it executes within a virtualized environment.

In another embodiment, the guest operating system, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 105, as described above.

FIG. 3B illustrates a block diagram of one embodiment of a plurality of networked computing devices in a system in which at least one physical host executes a virtual machine. The system includes a plurality of computing devices 100a, 100b, and 100c (collectively 100a-c), each comprising a management component 197a, 197b, 197c (tool stack in FIG. 3A), a hypervisor 191a, 191b, 191c, a plurality of virtual machines 196a, 196b, 196c, 196d, 196f (collectively 196a-f), and physical resources 221a, 221b, 228a, 228b. The plurality of computing devices 100a, 100b, and 100c may each be provided as computing devices, described above in connection with FIGS. 1, 2, and 3A. In one of these embodiments, and as described above in connection with FIGS. 1A-C, one or more computing devices may exchange data with one or more of the other computing devices regarding processors and other physical resources available in a pool of resources, allowing a hypervisor to manage a pool of resources distributed across a plurality of physical computing devices. In some embodiments, a computing device on which a virtual machine executes is referred to as a physical host or as a host machine.

In one embodiment, a management component may be a tools stack described above in connection with FIG. 3A. In other embodiments, a management component may provide a user interface for receiving, from a user such as an administrator, an identification of a virtual machine to provision and/or execute. In still other embodiments, a management component may provide a user interface for receiving, from a user such as an administrator, the request for migration of a virtual machine from one physical machine to another. In further embodiments, a management component may identify a computing device on which to execute a requested virtual machine and may instruct the hypervisor on the identified computing device to execute the identified virtual machine; such a management component may be referred to as a pool management component.

Figure 4A:
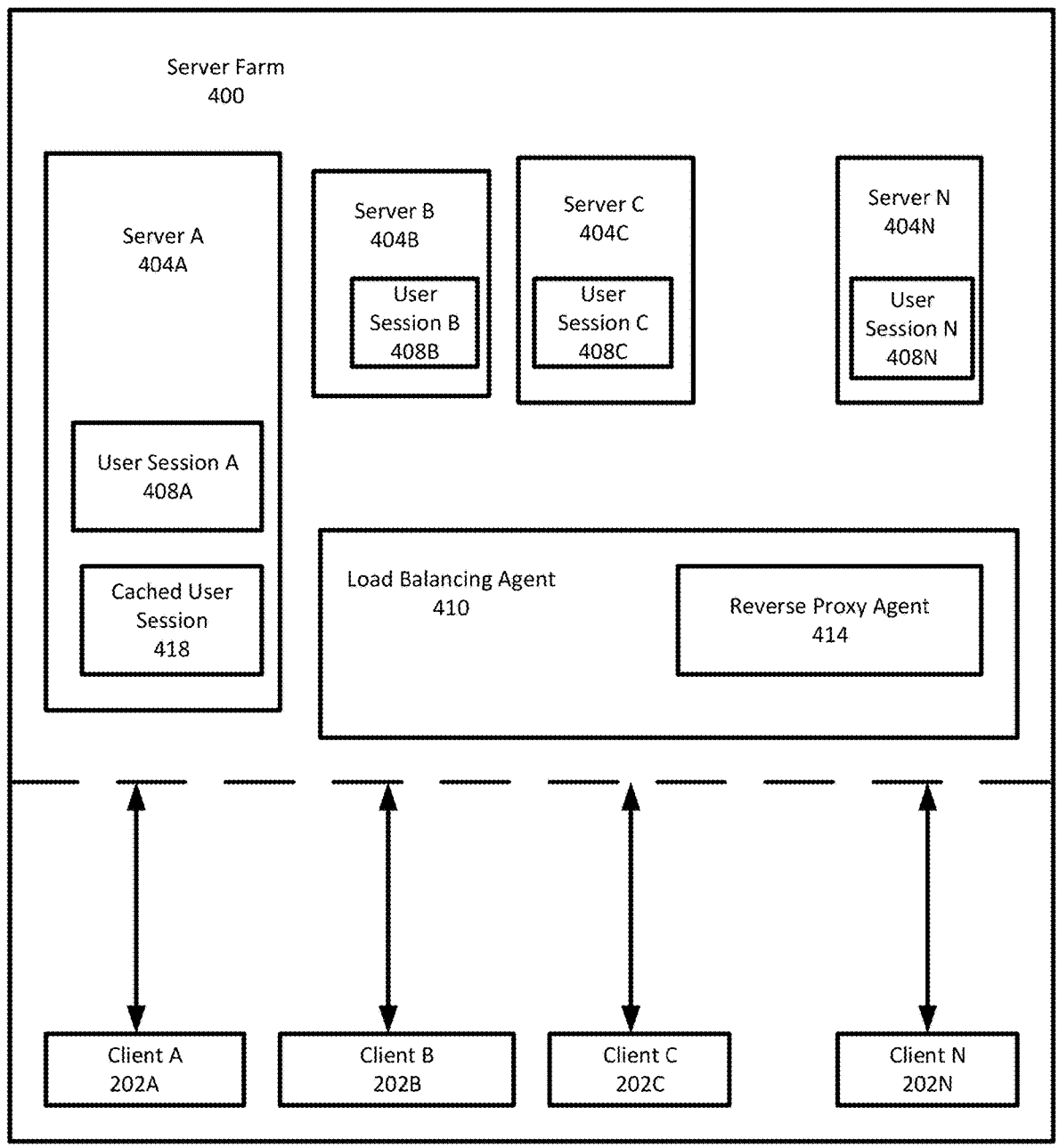
FIG. 4A is a block diagram illustrating an embodiment of a server farm.
Figure 4B:
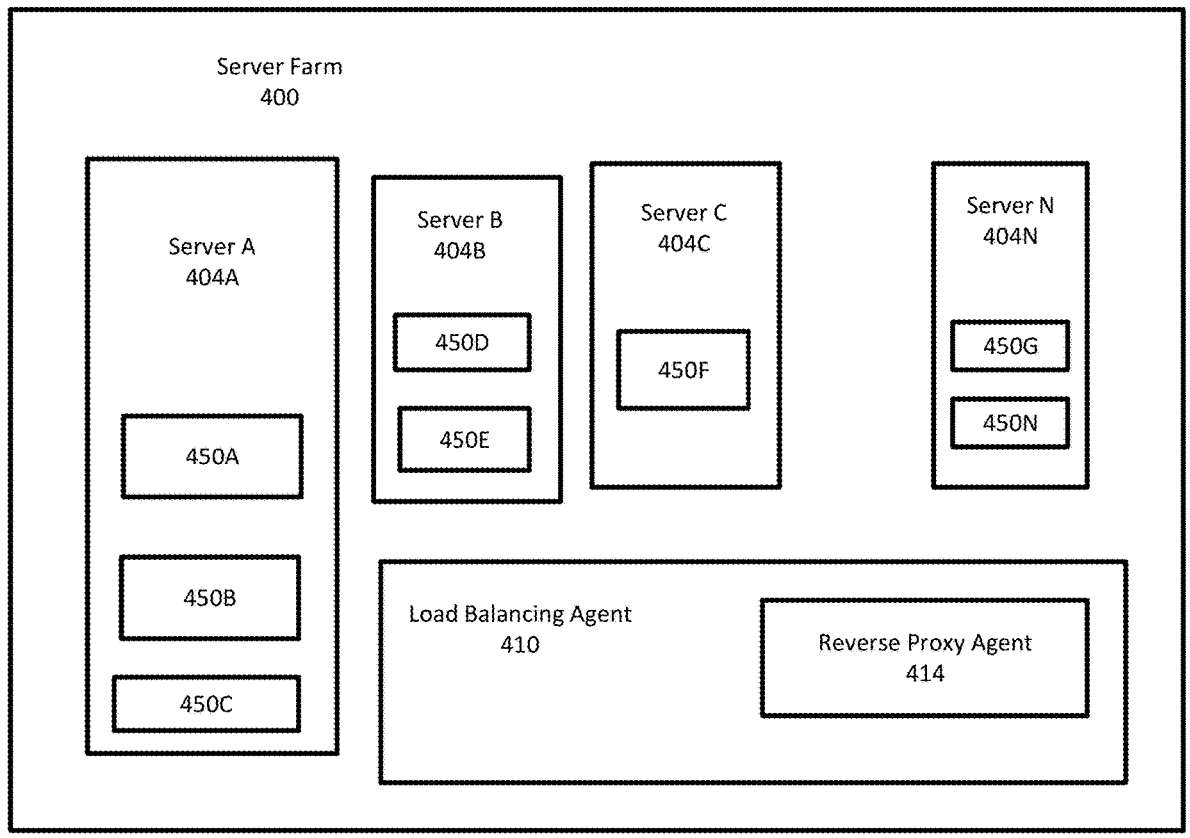
FIG. 4B is a block diagram illustrating an embodiment of a server farm including a plurality of virtual machines.

FIGS. 4A and 4B illustrate an embodiment of a server farm for performing power management methods described with respect to FIG. 5 below. The system includes a server farm 400 comprising one or more servers 404A-N. In communication with each server is a load balancing agent 410. The servers 404A-N can execute or host user sessions 408A-N where some of the user sessions can be cached user sessions 418. Communicating with the server farm 400 and thereby with at least one of the servers 404A-N are client computing machines 402A-N. Executing within the load balancing agent 410 or as part of the load balancing agent 410 is a reverse proxy agent 414.

Further referring to FIG. 4A, in one embodiment the system includes a server farm 400 comprising one or more servers 404. While FIG. 4A illustrates server A 404A, server B 404B and server C 404C, the server farm 400 can comprise a single server or an "N" number of servers where "N" is a whole number greater than 1. In some embodiments, the server farm 400 includes a group of servers 404A-N co-located on a common network that can be a private network having a domain particular to the server farm 400. In other embodiments, the server farm 400 includes a group of servers 404A-N connected to the same network switch, router or other networking appliance or device. While FIG. 4A illustrates the servers 404A-N as present within the server farm 400, in some embodiments the server 404A-N are not contained within the server farm 400.

Each server, in some embodiments, can execute or host a user session. A user session, in some embodiments, is a session during which a particular user establishes a virtual communication channel between a server or the server farm 400 and a client computing machine. A user establishes a virtual communication channel, in some instances, by requesting access to an application executing on one or more servers 404A-N. Responsive to this request, the server farm 400 can either direct a server to instantiate an instance of the requested application, or else a particular server can respond to the request by instantiating an instance of the requested application of its own accord. In addition to establishing a virtual communication channel, establishing a user session can include providing the client computing machine with access to a user profile particular to the user using the client to communicate with the server. This user profile, in some embodiments, includes applications, configurations, data and files specific to a particular user. In most embodiments, a user session can be characterized as a period of time during which a user accesses an application on a server. Therefore, when the user begins accessing the application, the user session begins. Similarly, when the user stops accessing the application, the user session ends. In some embodiments, when a user stops accessing the application, data associated with the user session can be stored in cache or another storage repository for a period of time. The data stored in cache can include: authentication information specific to the user; a copy of the user profile; an event log associated with the user session; or any other information associated with the previously active user session.

While FIG. 4A illustrates servers 404A-N hosting at least one active user session, each server can host or execute any number of active user sessions. Similarly, each server can host any number of active user sessions and any number of cached user sessions. A user session typically corresponds to a user. While FIG. 4A illustrates user sessions corresponding to client computing machines 402A-N, in some embodiments, a user session can correspond to a user. In this embodiment, a user could establish user session by requesting access to an application executing within the server farm 400 or on a server via a client computing machine. Similarly, a user session can correspond to a user who may establish the user session via any one of client A, client B, client C, and so on.

One or more servers in the server farm 400 may execute and/or comprise a virtualization environment (as discussed above with respect to FIGS. 3A and 3B) that allows multiple virtual machines to run on the same server. For example, one or more user sessions hosted by a server may be hosted by one or more virtual machines (not shown here) running on the server. In an embodiment, assuming that a workload (or user request) requires a certain number of separate virtual machines, such virtual machines can be distributed arbitrarily across a set of servers according to some figure of merit, such as performance, in the same manner as a stateless workload. However, it is not simply the work request which is being distributed to a server; rather, it is the actual virtual machine that is instructed to start at a server. FIG. 4B illustrates a multiple server configuration of FIG. 4A, having managed servers 404A-N, each containing a plurality of virtual machines 450A-N distributed across the servers 404A-N using methods now or hereafter known to those skilled in the art. For example, in an embodiment, the load balancing agent 410 may track the utilization of the server resources and determine the optimal distribution of virtual machines across the servers to minimize power consumption while maintaining efficient execution of the workload.

Executing within the sever farm 400 is a load balancing agent 410. The load balancing agent 410, in some embodiments, can execute on any server within the server farm 400. In other embodiments, the load balancing agent 410 can execute on any appliance within the server farm. In some embodiments, the load balancing agent 410 can execute on a computing machine not included within the server farm 400. This computing machine, in most embodiments, could communicate with the servers 404A-N within the server farm 400 via any one of: a server; an appliance within the server farm 400; a common private network through which the load balancing agent 410 can send and receive commands and data to the servers 404A-N; or by any other method or device able to transmit and receive commands and data to the servers 404A-N within the server farm 400.

The load balancing agent 410, in some embodiments, can balance an amount of load amongst one or more servers 404. Load can include any application or requests that require computing or memory resources. The amount of load on a computing machine can, in some embodiments, comprise the amount of processing and memory resources used by processes and applications executing on a computing machine. Balancing load can include directing application execution requests and requests to establish user sessions from one computing machine to another computing machine. Thus, the processor and memory resources used to execute an application instance or host a user session are shouldered by the computer to which that application execution request or user session establishment request is directed.

In one embodiment the load balancing agent 410 can comprise a software module or agent that executes within the distributed computing environment or server farm 400, or on a server within the server farm 400. In other embodiments, the load balancing agent 410 can be hardware able to perform the load balancing methods and processes described herein. In still other embodiments, the load balancing agent 410 can be any combination of software and hardware able to perform the load balancing methods and processes described herein.

In an embodiment, the load balancing agent 410 can evaluate the amount of load on a particular server by evaluating the server to determine any of the following: the amount of memory used by processes and applications executing on the server; the amount of processor resources used by processes and applications executing on the server; the number of processes executing on the server; the number of applications executing on the server; the number of virtual machines executing on the server; the number of user sessions executing on the server; the number of cached user sessions; the amount of available cache; the amount of bandwidth used by the server; and any other metric that can be used to determine the amount of load on a machine. The load balancing agent 410 can determine the amount of load on each individual server within the server farm 400. The load balancing agent can also determine the amount of load on a particular user session by determining any of the following: the amount of memory used by the session; the amount of processor resources used by the session; the number of processes and applications or application instances executing within the sessions; the amount of cache available to the session; the amount of cache used by the session; the amount of bandwidth used by the session; and any other metric that can be used to determine the amount of load on a machine.

In some embodiments, the load balancing agent 410 can determine an average load on the sessions hosted on a particular server or hosted within the server farm 400, by determining the amount of load on each session on a server or within the server farm 400 and based on the results, determining an average session load. In other embodiments, the load balancing agent 410 can determine an average session load by determining the amount of load on a predetermined number of user sessions and averaging the determined session loads to arrive at an average session load. The predetermined number of user sessions can be dictated by a user, by a system administrator, based in part on the number of user sessions executing on a server or within a server farm 400, or by any other method. In one embodiment, the predetermined number of sessions is the number of active sessions executing within the server farm 400. In another embodiment the predetermined number of sessions is the number of active sessions executing on a particular server. In still other embodiments, the predetermined number of sessions is an average number of sessions hosted by a server.

In some embodiments, the load balancing agent 410 can include and/or can execute in accordance with a reverse proxy agent 414. The reverse proxy agent 414 can in some embodiments be a software module or agent that executes within the load balancing agent 410 to perform the methods and processes described herein. In other embodiments, the reverse proxy agent 414 can be hardware able to perform the methods and processes described herein. In still other embodiments, the reverse proxy agent 414 can be any combination of hardware and software able to perform or execute the methods and processes described herein.

The reverse proxy agent 414, in one embodiment, can execute on a server within the server farm 400, or in another embodiment can execute on a computing machine or other appliance within the server farm 400. In some embodiments, the reverse proxy agent 414 can execute on a computing machine remotely located from the server farm 400 but in communication with anyone of the servers 404A-N, computing machine or appliance within the server farm 400. While FIG. 4A illustrates an embodiment where the reverse proxy agent 414 executes within the load balancing agent 410, in other embodiments the reverse proxy agent 414 can execute outside of the load balancing agent 410. In one embodiment the reverse proxy agent 414 can communicate with any server 404A-N included within the server farm 400, and in some embodiments can communicate directly with clients 402A-N communicating with servers 404A-N within the server farm 400.

The reverse proxy agent 414, in some embodiments, intercepts and accepts all connection requests from clients on behalf of the server farm 400. Furthermore, when a reverse proxy agent 414 accepts a request from a client, it can forward the request to an appropriate server of the server farm 400 that can fulfill it, and returns the server's response to the client so as to deliver seamless processing of user requests. The server selection may be based, for example, on one or more of load balancing, client request, language, client-server affinity, requested content (content-based routing), client identity, or other policies. A reverse proxy agent agent 414 may also include functions such as security, encryption, compression, and caching of content as a means to off-load the processing work of a server. In the case of caching, the proxy server is able to serve requests for which it has cached the requested content (typically static content), thus off-loading the request from the server. Here, the client request is not delivered to the server, but is handled entirely by the proxy server using its content cache. For functions such as security, encryption and compression, the reverse proxy agent serves as a pre-processing stage for the client requests and a post-processing stage for the web server responses, where all content is still delivered from the server. In an embodiment, the reverse proxy agent also functions to provide power management for a group of servers and/or virtual machines, as discussed below with respect to FIG. 5.

Communicating with the server farm 400 are clients 402A-N. Each client can be any of the clients or computing machines described herein. Installed between the clients 402A-N and the server farm 400 can be a virtual communication channel such as any of the communication channels described herein. Further, the clients 402A-N can communicate with the server farm 400 over a network such as any of the networks described herein. A client can host one or more user sessions. For example, a first user can use client A 402A to communicate with the server farm 400. Similarly, a second user can use client A 402A to communicate with the server farm 400. In some instances, the user session established by the first user and the user session established by the second user are two different user sessions.

While FIG. 4A illustrates the clients 402A-N communicating with the server farm 400, in some embodiments, the clients 402A-N communicate with the load balancing agent 410. In other embodiments, the clients 402A-N communicate with the reverse proxy agent 414. In still other embodiments, the clients 402A-N can communicate with the servers 404A-N within the server farm 400.

Figure 5:
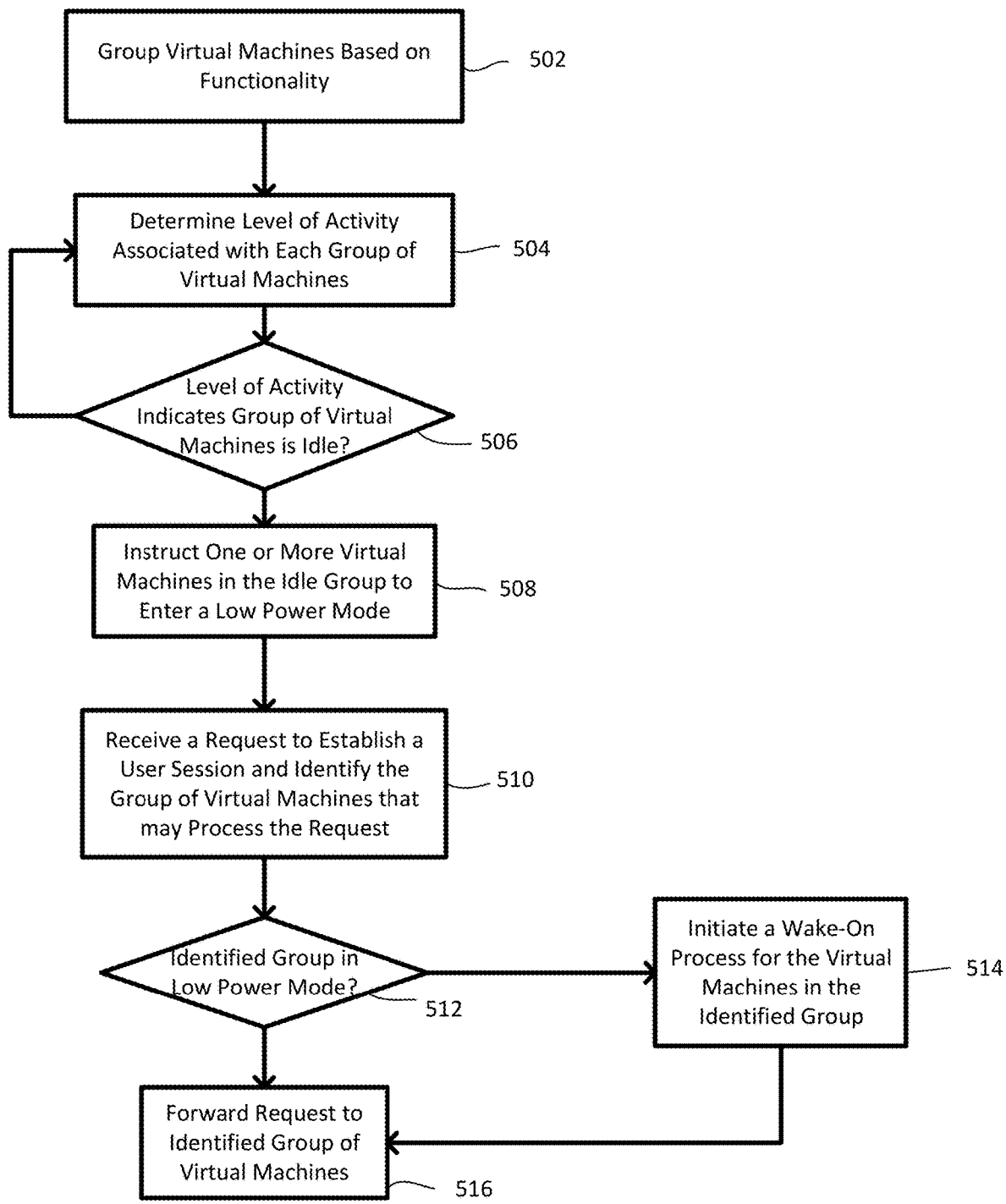
FIG. 5 is a flowchart illustrating an example method for performing virtual machine power management in a server farm.

Referring now to FIG. 5, an example method 500 for the power management of virtual machines in a server farm is illustrated. An example server farm 400 is illustrated in FIGS. 4A and 4B. Process 500 may be performed by a system, such as system 100. For example, in one or more embodiments, the process 500 illustrated in FIG. 5 and/or one or more steps thereof may be performed by a computing device (e.g., any device of FIGS. 1-3). In other embodiments, the process 500 illustrated in FIG. 5 and/or one or more steps thereof may be embodied in computer-executable instructions that are stored in a computer-readable medium, such as a non-transitory computer-readable memory. Alternatively or additionally, any of the steps in process 500 may be performed on any load balancing agent, reverse proxy agent, hypervisor, server, virtual machine, and/or computing device. While the following description refers to a reverse proxy agent performing the steps in process 500, any other computing device such as a load balancing agent, a hypervisor, a server, a virtual machine can perform one or more of the steps.

The process starts at 502, where the reverse proxy agent groups the virtual machines available on a server farm based on their functionality. In an embodiment, the reverse proxy agent groups the virtual machines that perform a similar function (application or service) into a group and apply certain policies to this group. The virtual machines within any particular group may be located on the same server or may be distributed among multiple servers. Furthermore, in an embodiment, one or more servers may include all the virtual machines that perform a similar function on a server farm (and no other virtual machines) such that grouping of virtual machines leads to a grouping of servers that include the virtual machines into the group. Alternatively and/or additionally, virtual machines that perform similar functions may be distributed across one or more servers on a server farm that also include virtual machines that perform certain other functions such that grouping of virtual machines does not necessarily lead to a grouping of servers that include the virtual machines into the group. In an embodiment, the reverse proxy agent may apply power management policies to virtual machines on a group basis, regardless of the physical location of the virtual machines (as discussed below). In an embodiment, a virtual machine may be grouped in more than one group.

Any number of different virtual machine groups may be defined based on functionality. In an example embodiment, the reverse proxy agent may, without limitation, place virtual machines performing database functions into a first group, virtual machines performing web server functions into a second group, virtual machines performing finance related functions in a third group, virtual machines performing security related functions in a fourth group, and so on. Such group assignments enable the reverse proxy agent to operate at a virtual machine granularity, a queue granularity, at a computing device granularity, a server granularity, or at a combination thereof.

In an embodiment, the reverse proxy agent may group new virtual machines added to a server farm as soon as they are instantiated, at regular time intervals, upon receipt of a request directed to the virtual machine, or the like.

In an embodiment, the reverse proxy agent may discover the functionality of a virtual machine using methods now or hereafter known to those skilled in the art (for example, from packet traffic received at a port associated with a virtual machine, by querying the virtual machine directly, from a hypervisor, from an administrator, or the like).

At 504, the reverse proxy agent can monitor and determine the level of activity associated with each group of virtual machines. In an embodiment, the reverse proxy agent may determine the level of activity associated with each group of virtual machines by analyzing a plurality of metrics associated with the virtual machines. Examples of the metrics may include, without limitation, power consumption attributed to the virtual machines in a group; level of utilization of memory, processing resources, network resources, disk utilization, or other resources attributed to the virtual machines in a group; thermal temperature generated by the virtual machines in a group; number of requests received and/or processed by the virtual machines in a group; frequency of requests received and/or processed by the virtual machines in a group or the like. The reverse proxy agent may receive the performance metrics using methods now or hereafter known to those skilled in the art (for example, from packet traffic received at a port associated with a virtual machine, by querying the virtual machine directly, from an administrator, from a hypervisor, or the like). The metrics may be assigned a level of significance (weight) for the determination of the level of activity associated with each group of virtual machines.

For each group of virtual machines, the reverse proxy agent may then determine 506 if the determined level of activity indicates that a group of virtual machines is inactive or idle. For example, the reverse proxy agent may determine that a group of virtual machines is inactive or idle if the level of activity associated with the group is below a threshold level and/or for a certain amount of time. In an embodiment, the threshold level and/or time may be the same for all groups of virtual machines. Alternatively, the threshold level and/or time may differ for different groups of virtual machines and may be determined by an administrator, based on activity history, functionality, or the like. In yet another embodiment, the threshold level and/or time may differ at different times of the day, week, month, or year. For example, the threshold level and time may be lower during after-work hours compared to those during working hours of a day.

In an embodiment, the reverse proxy agent may monitor and determine the level of activity associated with each group of virtual machines, without limitation, continuously, at specific time periods, upon occurrence of a triggering event (e.g., receipt of a request directed towards a group of virtual machines, receipt of an incoming packet), or the like.

If the determined level of activity indicates that a group is not inactive or idle (506: NO), the reverse proxy agent may continue monitoring the activity level associated with the group. However, if the determined level of activity indicates that a group is inactive or idle 506: YES), the reverse proxy agent may instruct 508 one or more virtual machines in the group to enter a low power mode such as, without limitation, standby, sleep, and/or power off mode, etc., wherein the virtual machines consume no and/or very little power compared to an active mode (i.e., the group of virtual machines is in an overall low power mode). For example, the reverse proxy agent may instruct a hypervisor associated with a virtual machine to put the machine in a standby, sleep, and/or power off mode. In an embodiment, the reverse proxy agent, the hypervisor, or any other device, may save the current state information of one or more virtual machines that enter a standby, sleep, and/or power off mode.

In an embodiment, all the virtual machines included in the group may be instructed to enter a standby, sleep, and/or power off mode (passive-passive mode). Alternatively and/or additionally, one or more virtual machines of the group may be kept active while one or more virtual machines enter a standby, sleep, and/or power off mode (active-passive mode). The number of virtual machines instructed to enter a standby, sleep, and/or power off mode may be determined based on, for example, the functionality associated with the group, the determined activity level associated with the group, a forecasted activity level, a forecasted number of requests that may be received by the group of virtual machines, frequency of requests received by the group of virtual machines, power consumption levels associated with active virtual machines, time required for reactivating the virtual machines, service levels required, or the like. For example, if the determined activity level is below a threshold level, all the virtual machines may be instructed to enter a standby, sleep, and/or power off mode. However, if the determined activity level is above a threshold level, at least one virtual machine may be kept active.

At 510, the reverse proxy agent may intercept and/or receive a request for establishing a user session (i.e., request for a resource on the server farm) from a client machine, and may identify the group of virtual machines that may process the request by, for example, parsing the request, functionality requested, or the like. The reverse proxy agent may then determine 512 whether the identified group of virtual machines identified is in a low power mode.

If the identified group of virtual machines is determined to be in a low power mode (512: YES), the reverse proxy agent may initiate 514 a wake on process for the virtual machines (i.e., activate the virtual machines) in the group that entered a standby, sleep, and/or power off mode. In an embodiment, when the virtual machines that entered a standby, sleep, and/or power off mode are activated, the previous state of the virtual machine may be restored using the saved state information.

In an embodiment, while the virtual machines are being re-activated, the reverse proxy agent may provide a default response (such as "loading", "processing", or the like) to the client machine if no virtual machines in the group are active (passive-passive mode) and/or if the active virtual machine in the group fail to respond to the request. For example, if all the virtual machines entered a standby, sleep, and/or power off mode, the reverse proxy agent may provide the default response. The reverse proxy agent may forward 516 the request to the appropriate virtual machine, group of virtual machines, load balancing agent, server, or the like, when one or more virtual machines in the group have been reactivated.

In an alternate embodiment, if at least one virtual machine in the group is active (active-passive mode), the reverse proxy agent may instruct the active virtual machine(s) to respond to the request while the remaining virtual machines are being re-activated. Specifically, the active virtual machine(s) initially receive the complete load for responding to the request which may then be redistributed upon re-activation of the remaining virtual machines in the group (by, for example, the load balancing agent). Hence, in an active-passive mode may be configured to keep a certain number of virtual machines active to maintain a required service level, reduce response time, maintain a desired activity level, or the like.

If the identified group of virtual machines is not determined to be in a low power mode (512: NO), the reverse proxy agent may directly forward 516 the request to the appropriate virtual machine or group of virtual machines via for example, a hypervisor or a load balancing agent.

Although embodiments of the invention have been discussed primarily with respect to specific arrangements, formats, protocols, etc. any other suitable design or approach can be used. For example, although server farms have been primarily discussed, aspects of the invention can be applicable to any group of devices. Furthermore, although the number of connections has been described in detail as a basis for controlling server power management, any other performance criteria or resource use measurement can be used including processor load; storage, port or bus utilization; available channels in a wireless network interface, etc.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for providing power management to a system comprising a plurality of resources each capable of supporting one or more virtual machines, the method comprising, by a processor:
    grouping a plurality of virtual machines into a plurality of groups, wherein the grouping comprises assigning each of the plurality of virtual machines to one or more of the plurality of groups based on functionality;
    determining a level of activity associated with each of the plurality of groups;
    determining, for each of the plurality of groups, whether the level of activity is indicative of an idle state;
    in response to determining that the level of activity associated with at least one group is indicative of the idle state, comparing the level of activity to a threshold level of activity;

instructing all of the virtual machines of the at least one group to operate in a low power mode when the level of activity is below the threshold level of activity; and when the level of activity is above the threshold level of activity, determining a number of virtual machines to operate in the low power mode for the at least one group based on at least a forecasted activity level of activity for that group and a forecasted number of requests to be received by that group, where the number of virtual machines is at least one; and instructing the determined number of virtual machines of the at least one group to operate in the low power mode.

2. The method of claim 1, further comprising:
receiving, by the processor, a request to establish a user session with at least one of the plurality of resources;
identifying, by the processor, at least one group of the plurality of groups capable of processing the request;
determining whether the identified at least one group is in the low power mode;
in response to determining that the identified at least one group is in the low power mode, initiating a wake on process for the at least one group.

3. The method of claim 2, wherein initiating the wake on process comprises re-activating virtual machines from the low power mode in the identified at least one group.

4. The method of claim 3, wherein:
all the virtual machines in the at least one group are in the low power mode; and
the method further comprises providing a default response to a client machine from which the request was received while the virtual machines are re-activated.

5. The method of claim 2, further comprising, in response to determining that the identified at least one group is not in a low power state, transmitting the request to the identified at least one group.

6. The method of claim 2, wherein:
at least one virtual machine in the identified at least one group is active; and
the method further comprises transmitting the request to the at least one active virtual machine.

7. The method of claim 1, wherein:
determining the level of activity associated with each of the plurality of groups further comprises analyzing one or more metrics associated with virtual machines included in each of the plurality of groups; and
the metrics comprise at least one utilization of memory by virtual machines in a group, utilization of processing resources by virtual machines in a group, utilization of network resources by virtual machines in a group, disk utilization by virtual machines in a group, number of requests received by virtual machines in a group, frequency of requests received by virtual machines in a group, and number of requests processed by virtual machines in a group.

8. The method of claim 7, wherein at least two of said metrics have different assigned levels of significance for determining the level of activity associated with at least one group of the plurality of groups.

9. The method of claim 1, wherein the threshold level of activity is determined based on functionality associated with a group.

10. The method of claim 1, further comprising, by the processor:
discovering a functionality of each virtual machine of the plurality of virtual machines, wherein the assigning each of the plurality of virtual machines includes grouping those virtual machines with a same discovered functionality into the one or more of the plurality of groups.

11. The method of claim 1, wherein the level of activity associated with at least one of the plurality of groups is determined by analyzing at least one metric comprising a frequency of requests received by virtual machines in a group.

12. The method of claim 1, further comprising:
creating a new instance of a virtual machine; and
adding the virtual machine to one of the plurality of groups responsive to said creating.

13. The method of claim 1, further comprising:
receiving a request directed to a given virtual machine of the plurality of virtual machines; and
adding the given virtual machine to one of the plurality of groups responsive to said receiving.

14. The method of claim 1, wherein the level of activity associated with at least one group of the plurality of groups is determined in response to a reception of a request directed to the at least one group or in response to a reception of an incoming packet.

15. An apparatus for providing power management to a cloud computing system comprising:
one or more electronic servers each capable of supporting one or more virtual machines,
at least one computer processor comprised of an electronic circuit and configured to:
group a plurality of virtual machines into a plurality of groups, wherein the grouping comprises assigning each of the plurality of virtual machines to one or more of the plurality of groups based on functionality;
determine a level of activity associated with each of the plurality of groups;
determine, for each of the plurality of groups, whether the level of activity is indicative of an idle state;
in response to determining that the level of activity associated with the at least one group is indicative of the idle state, comparing the level of activity to a threshold level of activity;
instructing all of the virtual machines of the at least one group to operate in a low power mode when the level of activity is below the threshold level of activity; and
when the level of activity is above the threshold level of activity,
determining a number of virtual machines to operate in the low power mode for the at least one group; and
instructing the determined number of virtual machines of the at least one group to operate in the low power mode;
wherein the number of virtual machines to operate in the low power mode is determined based on at least a forecasted activity level of activity for that group and a forecasted number of requests to be received by that group.

16. The apparatus of claim 15, wherein the at least one computer processor is further configured to:
receive a request to establish a user session with at least one of the plurality of resources; identify at least one group of the plurality of groups capable of processing the request; determine whether the identified at least one group is in the low power mode; in response to determining that the identified at least one group is in the low power mode, initiate a wake on process for the at least one group.

17. The apparatus of claim 16, wherein initiating the wake on process comprises re-activating virtual machines from the low power mode in the identified at least one group.

18. The apparatus of claim 17, wherein:
all of the virtual machines in the at least one group are in the low power mode; and
the computer processor is configured to provide a default response to a client machine from which the request was received while the virtual machines are re-activated.

19. The apparatus of claim 16, wherein the computer processor is further configured, in response to determining that the identified at least one group is not in a low power state, to transmit the request to the identified at least one group.

20. The apparatus of claim 16, wherein:
at least one virtual machine in the identified at least one group is active; and
the computer processor is further configured to transmit the request to the at least one active virtual machine.

21. The apparatus of claim 15, wherein:
the computer processor is configured to determine the level of activity associated with each of the plurality of groups by analyzing one or more metrics associated with virtual machines included in each of the plurality of groups; and
wherein the metrics comprise at least one of utilization of memory by virtual machines in a group, utilization of processing resources by virtual machines in a group, utilization of network resources by virtual machines in a group, disk utilization by virtual machines in a group, number of requests received by virtual machines in a group, frequency of requests received by virtual machines in a group, and number of requests processed by virtual machines in a group.

22. The apparatus of claim 15, wherein the threshold level is determined based on functionality associated with a group.

23. The apparatus of claim 15, wherein the computer processor is further configured to:

discover a functionality of each virtual machine of the plurality of virtual machines, wherein the assigning each of the plurality of virtual machines includes grouping those virtual machines with a same discovered functionality into the one or more of the plurality of groups.

24. A method comprising:
grouping, by a computing device, virtual machines hosted on servers into groups based on functionality of the virtual machines, the computing device being in communication with the virtual machines of the groups and configured to intercept and accept requests from a client on behalf of the servers, and the groups including virtual machines distributed across one or more servers;
determining, by the computing device, a level of activity of individual groups of virtual machines based on a frequency of requests received by the computing device, the level of activity being indicative of at least one group of the virtual machines being in an idle state, and the requests being directed to individual groups of virtual machines to establish a user sessions;
in response to the determination that the level of activity is indicative of at least one group of virtual machines being in an idle state, comparing the level of activity to a threshold level of activity;
instructing all of the virtual machines of the at least one group to operate in a low power mode when the level of activity is below the threshold level of activity; and
when the level of activity is above the threshold level of activity,
determining, by the computing device, a number of virtual machines of that group to operate in the low power mode based on at least a forecasted activity level of activity for that group and a forecasted number of requests to be received by that group; and
instructing, by the computing device, the determined number of virtual machines of the at least one group to operate in the low power mode.

* * * * *